(12) United States Patent
Morselli et al.

(10) Patent No.: US 9,856,967 B2
(45) Date of Patent: Jan. 2, 2018

(54) TORQUE ESTIMATION FOR WORK MACHINE POWER TRAIN

(71) Applicant: CNH Industrial America LLC, New Holland, PA (US)

(72) Inventors: Riccardo Morselli, San Vito di Spilamberto (IT); Garth H. Bulgrien, Ephrata, PA (US); Stefano Fiorati, Occhiobello (IT); Eugenio Faggioli, Turin (IT)

(73) Assignee: CNH Industrial America LLC, New Holland, PA (US)

( * ) Notice: Subject to any disclaimer, the term of this patent is extended or adjusted under 35 U.S.C. 154(b) by 155 days.

(21) Appl. No.: 14/250,722

(22) Filed: Apr. 11, 2014

(65) Prior Publication Data
US 2015/0292612 A1  Oct. 15, 2015

(51) Int. Cl.
| F16H 57/01 | (2012.01) |
| G01L 3/22 | (2006.01) |
| G01M 13/02 | (2006.01) |
| G01L 3/04 | (2006.01) |

(52) U.S. Cl.
CPC .............. F16H 57/01 (2013.01); G01L 3/04 (2013.01); G01L 3/22 (2013.01); G01M 13/021 (2013.01); *F16H 2057/012* (2013.01); *F16H 2057/016* (2013.01)

(58) Field of Classification Search
CPC ...... F16C 19/52; F16C 19/522; F16C 19/525; F16C 17/22; F16C 17/246; F16C 2326/02; F16C 2233/00; F16D 2500/5012; F16D 2300/18; F16D 66/028; F16H 2057/012; F16H 2057/016; F16H 57/01; G01L 3/04; G01L 3/10; G01L 3/101; G01L 5/0023; G01M 13/021

USPC ....... 74/411; 180/14.5, 338, 206.3; 280/735; 324/207.13, 207.14, 245, 179, 219, 529; 384/448, 278, 493, 548, 557; 464/23

See application file for complete search history.

(56) References Cited

U.S. PATENT DOCUMENTS

| 3,224,262 A | 12/1965 | Shipley |
| 3,832,897 A | 9/1974 | Schenck |
| 4,188,821 A * | 2/1980 | Elias .................... G01L 3/1471 73/862.31 |

(Continued)

FOREIGN PATENT DOCUMENTS

DE  103 01 610 A1  8/2004

OTHER PUBLICATIONS

"IMI Model 653A01 Ultra Low Frequency Displacement Sensor." IMI Model 653A01 Ultra Low Frequency Displacement Sensor. 2016. Accessed Jun. 21, 2016. http://www.imi-sensors.com/displacement_sensor.*

(Continued)

*Primary Examiner* — Terence Boes
(74) *Attorney, Agent, or Firm* — Rebecca L. Henkel; Rickard K. DeMille

(57) ABSTRACT

A work machine having a diesel engine driving a plurality of ground movement devices to tow an agricultural implement. A torque estimating system is employed to determine the level of torque in the drive train between the diesel engine and the ground movement devices. The torque estimation device is a sensor determining the axial and radial deflection of an input shaft as a function of the torque transmitted between a pair of adjacent gears in the power train.

16 Claims, 3 Drawing Sheets

(56) References Cited

U.S. PATENT DOCUMENTS

| | | | |
|---|---|---|---|
| 5,018,393 A | 5/1991 | Seegers | |
| 5,073,157 A * | 12/1991 | Herscovici | F16H 37/084 474/237 |
| 5,143,458 A | 9/1992 | Alff et al. | |
| 5,163,570 A * | 11/1992 | Mundis | B66F 17/006 212/247 |
| 5,182,953 A * | 2/1993 | Ellinger | G01L 3/12 324/244.1 |
| 5,386,733 A | 2/1995 | Hesthamar et al. | |
| 5,526,704 A | 6/1996 | Hoshina et al. | |
| 5,591,925 A | 1/1997 | Garshelis | |
| 5,816,711 A * | 10/1998 | Gingrich | F16C 19/386 384/448 |
| 5,817,952 A | 10/1998 | Swisher et al. | |
| 5,899,829 A * | 5/1999 | Salecker | B60W 10/02 477/78 |
| 5,905,212 A | 5/1999 | Moses et al. | |
| 5,992,243 A * | 11/1999 | Leeper | B60K 23/0808 180/247 |
| 6,009,764 A | 1/2000 | Fukunaga | |
| 6,370,967 B1 | 4/2002 | Kouketsu et al. | |
| 6,543,305 B1 * | 4/2003 | Van Cor | F16H 3/363 74/348 |
| 6,619,451 B2 * | 9/2003 | Hrazdera | B60K 25/06 192/103 C |
| 7,140,994 B2 * | 11/2006 | Mundis | B66C 23/84 475/158 |
| 7,331,901 B2 * | 2/2008 | Busch | A01D 69/00 477/110 |
| 7,409,878 B2 | 8/2008 | Von Beck et al. | |
| 7,478,567 B2 | 1/2009 | Varonis et al. | |
| 7,493,831 B2 | 2/2009 | Varonis | |
| 7,501,811 B2 | 3/2009 | Ono | |
| 7,702,472 B2 | 4/2010 | Taniguchi et al. | |
| 7,727,114 B2 * | 6/2010 | Tarasinski | A01B 71/06 180/53.7 |
| 7,771,314 B2 * | 8/2010 | Eguchi | B60T 7/02 477/109 |
| 7,860,663 B2 * | 12/2010 | Miyasaka | G01H 1/003 702/113 |
| 8,167,499 B2 * | 5/2012 | Taniguchi | G01L 5/0023 324/207.25 |
| 9,097,342 B2 * | 8/2015 | Dix | F16H 61/472 |
| 9,233,607 B2 * | 1/2016 | Huber | B60W 30/1888 |
| 9,333,858 B2 * | 5/2016 | Huber | B60W 30/1888 |
| 2002/0092360 A1 * | 7/2002 | McDearmon | F16C 19/522 73/795 |
| 2007/0058892 A1 * | 3/2007 | Motohashi | B60B 27/0005 384/448 |
| 2008/0144985 A1 * | 6/2008 | Joki | B60B 3/04 384/448 |
| 2008/0214348 A1 * | 9/2008 | Hasegawa | F16H 37/043 475/80 |
| 2009/0229379 A1 * | 9/2009 | Ozaki | B60B 27/0005 73/862.69 |
| 2011/0185823 A1 * | 8/2011 | Nishikawa | F16C 19/186 73/862.041 |
| 2011/0264345 A1 | 10/2011 | Heim et al. | |
| 2012/0078537 A1 * | 3/2012 | Ince | G01M 13/022 702/42 |
| 2012/0118081 A1 | 5/2012 | Eicke et al. | |
| 2014/0026691 A1 * | 1/2014 | Huber | B60W 30/1888 74/15.86 |
| 2014/0345374 A1 * | 11/2014 | Morselli | F16H 59/16 73/115.02 |
| 2016/0046185 A1 * | 2/2016 | Morscheck | B60K 17/348 701/65 |

OTHER PUBLICATIONS

Klubnik, Renard, Applications Engineer,. Measuring Displacement Using Accelerometers. PDF. Germantown, MD: Wilcoxon Research, a Meggitt Group Company, Mar. 28, 2008.*

European Search Report dated Sep. 2, 2015 for European Application No. 15 16 2998 (5 pages).

* cited by examiner

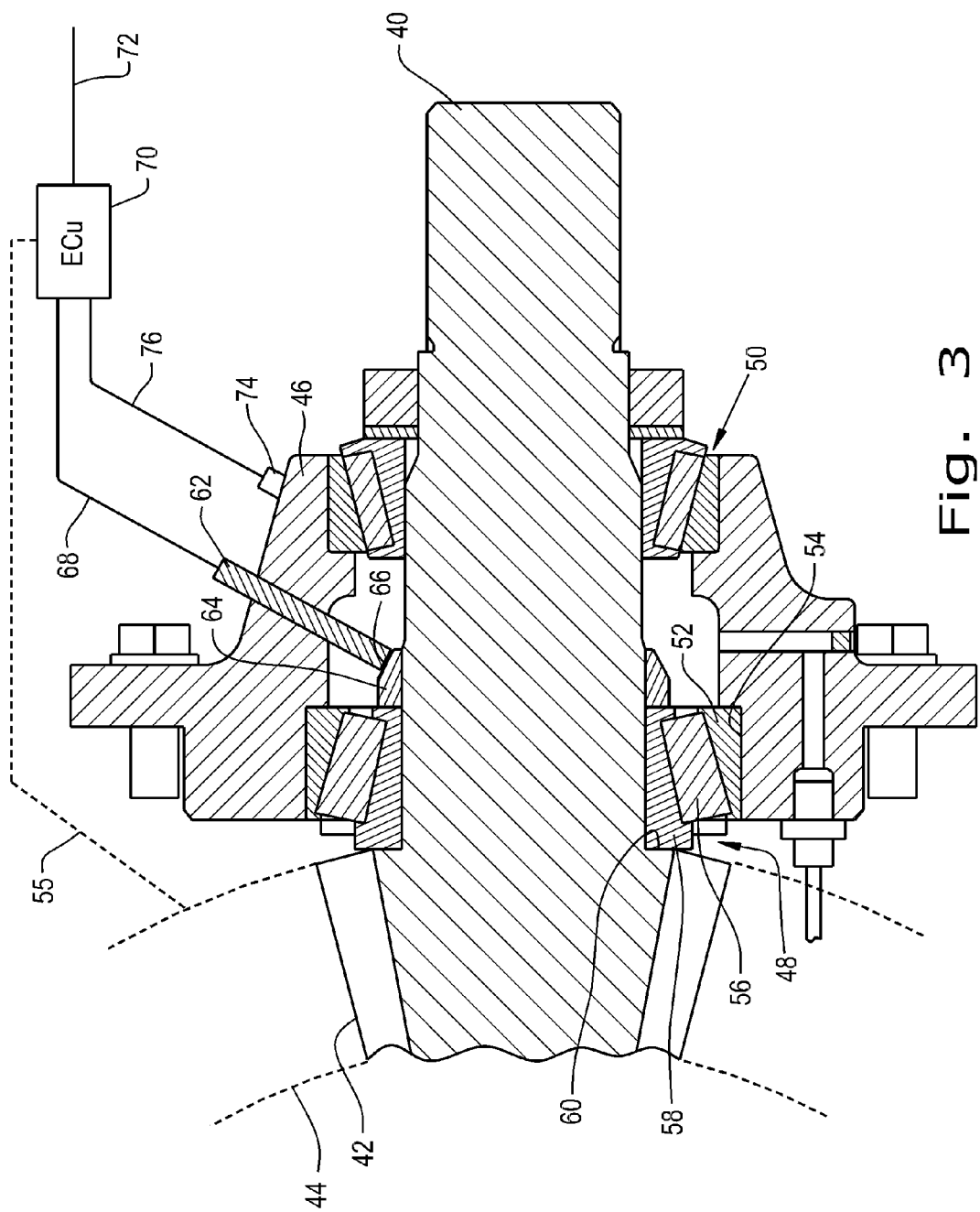

US 9,856,967 B2

TORQUE ESTIMATION FOR WORK MACHINE POWER TRAIN

BACKGROUND OF THE INVENTION

1. Field of the Invention

The present invention relates to work machines, and more particularly to torque estimation within the power train for such work machines.

2. Description of the Related Art

Work machines such as tractors have increased in size to provide more capacity to pull tillage equipment that spans a significant lateral distance to increase operating efficiency. Such tractors may be configured with an articulation joint for steering, four wheel or four track drive, and ideally operate with approximately a 50-50 fore and aft torque split from the engine. When the tillage machine encounters significant loading in the soil, it is possible for an increased proportion of the torque to pass to the rear axle, thus creating a potential for a shortened life.

Attempts have been made in various power trains to measure torque at locations other than the engine flywheel. The devices used have involved significant and complicated alterations to the structure itself of the torque carrying element. While providing measurement of torque, the prior approaches do so at a greatly increased expense and complexity. Furthermore, the structure of certain power train components such as axle assemblies have been fined tuned and optimized for long term torque carrying ability. The alterations to the components necessitated by prior art systems compromise the optimized design.

What is needed in the art therefore is a simplified torque estimation that does not alter the structure of a drive line component.

SUMMARY OF THE INVENTION

The present invention provides a simplified and non-intrusive apparatus for estimating torque carried by the power train of a work machine.

The invention, in one form, is directed to a power train component having an input shaft and a driving gear fixed to the input shaft. At least one bearing assembly supports the input shaft. A housing is provided for mounting the bearing assembly and a sensor detects displacement of one of said driving and driven gears in response to bearing deflections reacting to the level of torque transmitted by the driving gear.

The invention, in another form, is directed to a work machine including a chassis and a prime mover providing a torque output. A plurality of ground movement devices is included on the chassis and a power train selectively connects the torque output of the prime mover to the ground movement devices. The power train includes an input shaft connected to the prime mover and a driving gear fixed to the input shaft. At least one bearing assembly supports the input shaft. A housing is provided for mounting the bearing assembly and a sensor detects displacement of one of said driving and driven gears in response to bearing deflections relating to the level of torque transmitted by the driving gear.

An advantage of the present invention is the simplified and effective determination of over torque conditions in selected portions of a work machine power train.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 3 is an expanded cross-sectional view of a power train component of the work machine of FIG. 2.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
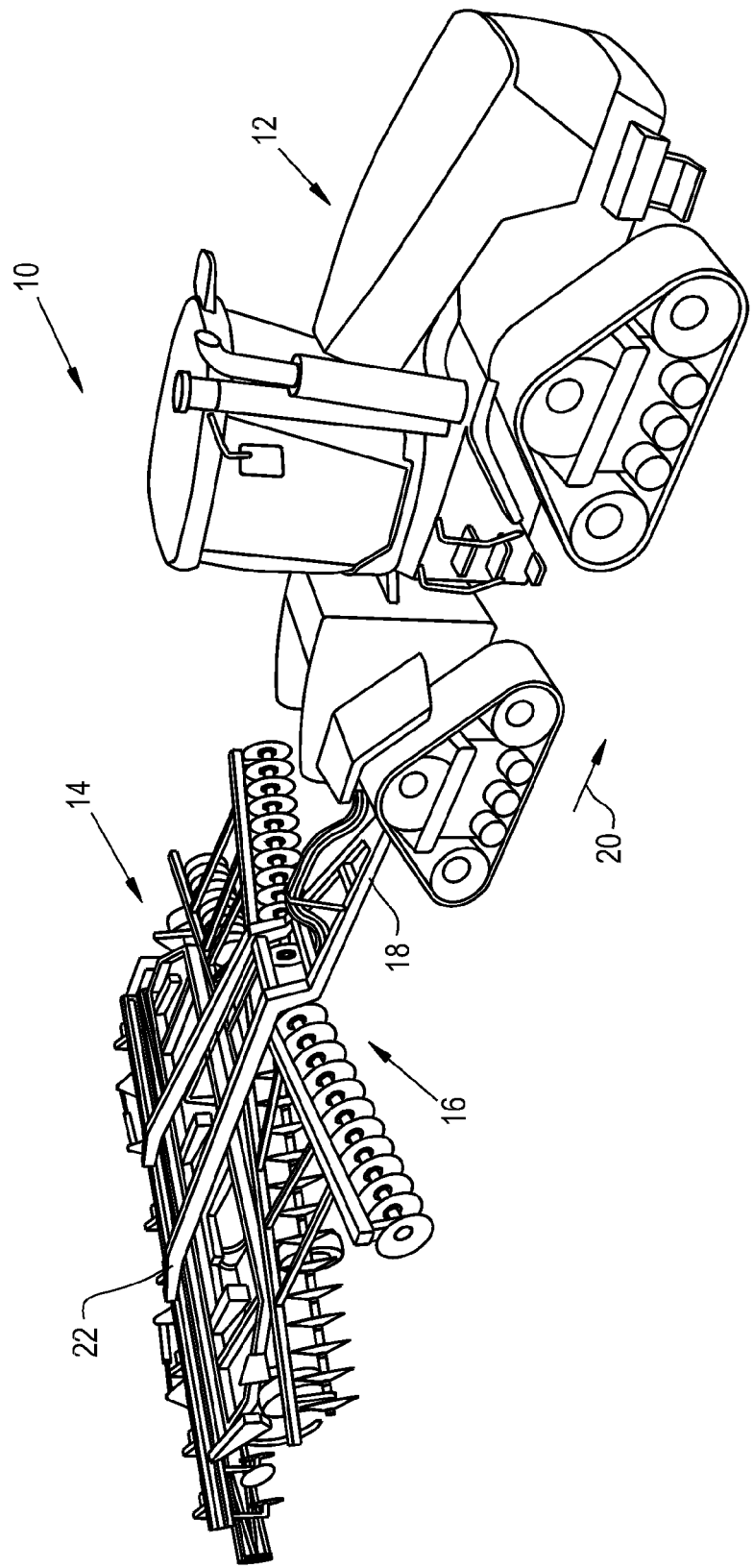
FIG. 1 is a perspective view of an agricultural implement and work machine incorporating the present invention.

Referring now to the drawings, and more particularly to FIG. 1, there is shown an agricultural implement 10 including a work machine 12 which pulls a tillage apparatus 14 by means of frames 18 and 22 in a forward direction 20. The tillage apparatus 14 includes various elements such as blade disks 16 for penetrating, breaking up and smoothing the soil prior to planting. Depending up on the conditions, the loads transmitted back through the frame 18 and thus to the work machine 12 can increase significantly. The increase is amplified when the tillage apparatus 14 has significant lateral spans for treating wider swaths of soil.

Figure 2:
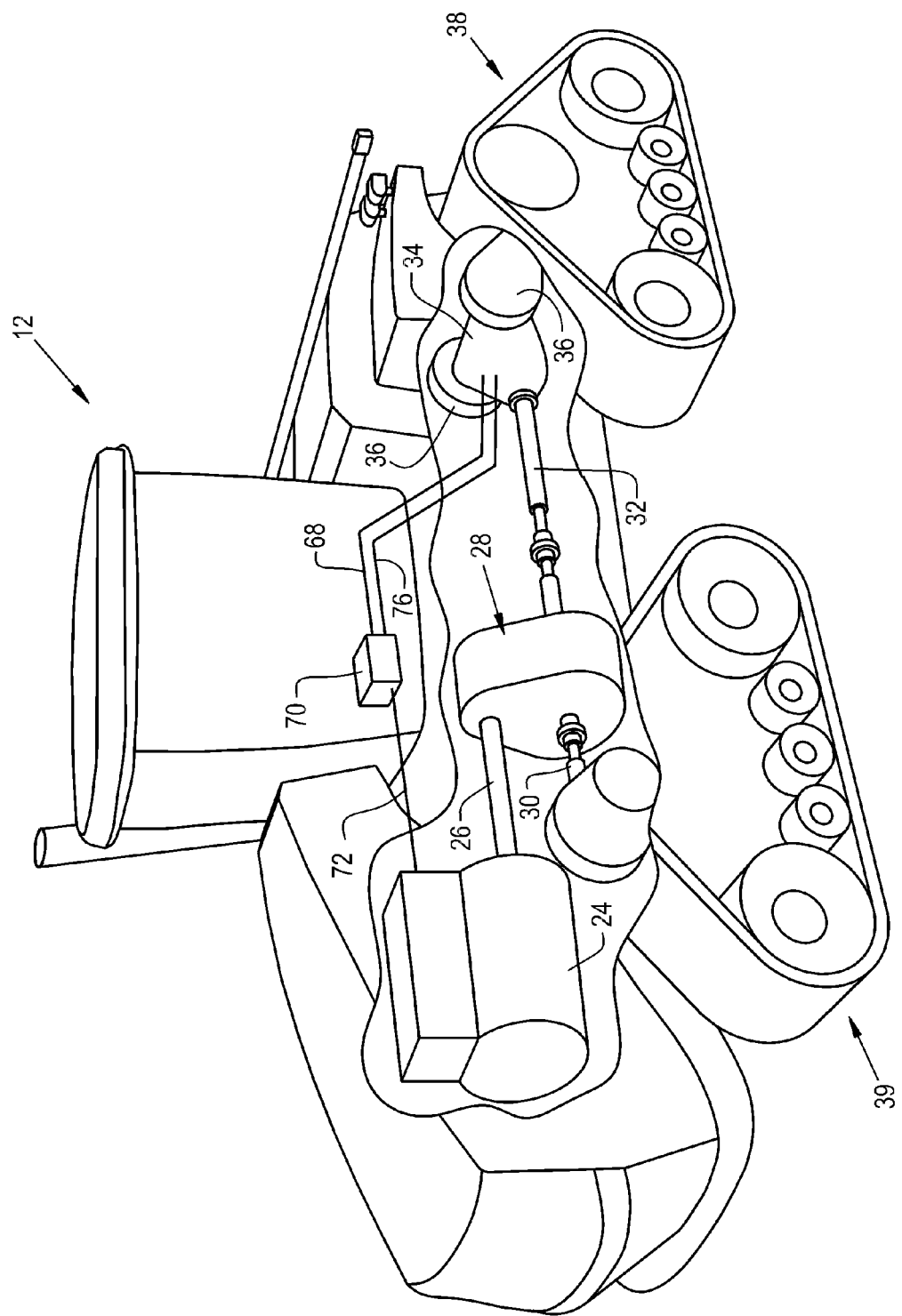
FIG. 2 is a perspective, partially cut away, view of the work machine of FIG. 1

In Fig. 2, the work machine 12 is oriented in a direction opposite to that shown in FIG. 1. The work machine includes a prime mover 24 which is usually in the form of a diesel engine, owing to its torque capability, dependability and fuel efficiency. The output from the engine 24 passes through output shaft 26 to a power train transmission component 28. The power train transmission component 28 has a forward extending output shaft 30 and a rearward extending shaft 32. Rear shaft 32 extends to a differential unit 34 which is connected through appropriate gear reduction assemblies 36 to power endless track assemblies 38. The work machine 12 has forward endless track assemblies 39 with a similar power transmitting arrangement. While the endless track assemblies 38 and 39 are illustrated as powered ground movement devices, it should be apparent to those skilled in the art that wheeled assemblies may also provide ground movement. There is no differential between the front and rear shafts so that the torque split depends substantially on the weight distribution between the front and rear endless track assemblies. At rest, the ratio is 2/3 front and 1/3 rear.

As the work machine 12 is operated in the field, the torque split between the front endless track assemblies 39 and the rearward endless track assemblies 38 moves rearward. As the load on the frame 18 for the tillage device 14 increases, there is a loading of the rear endless track assemblies 38 that can increase to the point where it is as an impact on the longevity of drive components such as the differential assembly 34.

In accordance with the present invention, the device illustrated in FIG. 3 is employed to determine the torque transmitted at a location away from the prime mover and to use that value to control the amount of torque applied by the prime mover 24 to the system.

FIG. 3 shows a partial section of the elements of the differential assembly 34 and includes an input shaft 40 providing torque from the prime mover 24 (via shaft 32) to a driving gear 42, herein shown as integral with the input shaft 40. Driving gear 42 is shown as an input pinion that meshes with driven ring gear 44, shown in dashed lines, to pass the torque from prime mover 24 ultimately to the endless track assemblies 38. As discussed below, the driving and driven gears may be in a form other than a pinion meshing with a ring gear and may be straight bevel gears or hypoid gears. Even spur gears may be employed to practice the present invention.

The input shaft 40 is supported in housing 46 by a pair of roller bearing assemblies 48 and 50, respectively. Bearing assemblies 48 and 50 have inner and outer races that are received respectively over input shaft 40 and within annular recesses in housing 46. Specifically, bearing assemblies 48 and 50 are herein illustrated as roller bearing assemblies with bearing assembly 48 having an outer race 52 received in a recess 54 of housing 46. A plurality of rollers 56 and an inner race 58 telescoped over shaft 40 and received against a shoulder 60 make up the other elements of bearing assembly 48. The structure of bearing assembly 50 is similar and is not repeated to enable a focus on the present invention.

During operation, torque is transmitted through shaft 40 and to driving gear 42. It meshes with and reacts to opposing forces from gear 44 relating to the load ultimately placed on the drive train. The reaction loads between gears 44 and 42 cause a deflection in bearing assembly 48 and thus shaft 40. This deflection is proportional to the torque reaction between the gears. This deflection results in displacement of inner ring 58 and shaft 40 relative to housing 46. In accordance with the present invention, a sensor 62 is positioned to detect the displacement of a ring 64 positioned over shaft 40. Ring 64 has an angled conical face 66 which allows sensor 62 and inner race 58 of bearing assembly 48 relative to housing 46. It should be noted that the deflection of the gear 44 may be measured as an alternative way of determining torque load through the application of a deflection signal to the ECU 70 as shown by dashed line 55.

Sensor 62 may be any one of a number of sensors that determines displacement. Preferably, it may be of the eddy current type of sensor to provide convenient signal manipulation. The signal from the sensor 62 is fed via line 68 to an electronic control unit (ECU) 70 which may be the same controller as is used to control the operation of the diesel engine 24 of FIG. 2 via line 72.

In operation, the transmittal of torque through shaft 40, gears 42 and 44 causes a deflection of the bearing assembly 48 adjacent sensor 62. The deflection is measured and an output signal is calculated both analytically and empirically that is proportional to the torque transmitted between the gears. The deflection being measured is in the range of 10ths of millimeters. As a result, the thermal expansion of the materials forming the housing 46, the bearing and shaft need to be accounted for within the controller 60. For this purpose, a sensor 74 detects the temperature of housing 46 and sends a signal to the ECU 70 via line 76 that is used to compensate for thermal expansion of the components when converting the bearing deflection to estimated torque. As would be apparent to those skilled in the art, this may be done using appropriate digital control apparatus and software.

The utilization of bearing deflection may be employed to simply and cost-effectively determine any over-torque situation requiring a reduction in engine power output. The deflection caused by the interaction between the gears may be for helix gears or spur gears. The ring's angled or conical surface 66 enables the sensor 62 to be conveniently mounted within housing 46 and not disturb the operation of bearing assembly 48 while at the same time detecting both axial and radial deflection closely adjacent bearing assembly 48.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A power train component comprising:
    an input shaft;
    a driving gear fixed to said input shaft;
    a driven gear meshing with said driving gear;
    at least one bearing assembly for supporting said input shaft;
    a housing for mounting said bearing assembly; and,
    a sensor for detecting deflection of one of said driving and driven gears reacting to the level of torque transmitted between said driving and driven gears, wherein said sensor is positioned at an angle with respect to a plane perpendicular to the rotational axis of said input shaft so as to provide access around said bearing assembly.

2. The power train component as claimed in claim 1 wherein said sensor detects displacement of said input shaft adjacent said bearing assembly in response to bearing deflections reacting to the level of torque transmitted between said driving and driven gears.

3. The power train component as claimed in claim 2, wherein said driving gear is a pinion gear.

4. The power train component as claimed in claim 1, further comprising a ring telescoped over said input shaft and adjacent said bearing assembly, said ring having a conical face cooperating with the angled sensor to detect both axial and radial displacement.

5. The power train component as claimed in claim 2, wherein said sensor is an eddy-current sensor.

6. The power train component as claimed in claim 2, further comprising an electronic control unit (ECU).

7. The power train component as claimed in claim 6, further comprising a sensor for detecting temperature of said housing, said sensor providing a signal to said ECU for compensating the temperature variations of said bearing housing relative to displacement of said bearing assembly in response to torque inputs.

8. A work machine comprising:
    a chassis;
    a prime mover providing a torque output;
    a plurality of ground movement devices connected with said chassis;
    a power train selectively connecting the torque output of said prime mover to said ground movement devices, said power train including:
    an input shaft receiving torque from said prime mover;
    a driving gear fixed to the input shaft and receiving torque inputs from said prime mover;
    a driven gear meshing with said driving gear;
    at least one bearing assembly for journaling said input shaft;
    a housing for mounting said bearing assembly; and,
    a sensor for detecting displacement of one of said driving and driven gear deflections reacting to the level of torque transmitted between said driving and driven gears, wherein said sensor is positioned at an angle with respect to a plane perpendicular to the rotational axis of said input shaft so as to provide access around said bearing assembly.

9. The work machine as claimed in claim 7, wherein said sensor detects displacement of said input shaft adjacent said bearing assembly in response to bearing deflections reacting to the level of torque transmitted between said driving and driven gears.

10. The work machine as claimed in claim 8, wherein said driving gear is a pinion gear and said driven gear is a ring gear.

11. The work machine as claimed in claim 9, further comprising a ring telescoped over said input shaft and adjacent said bearing assembly, said ring having a conical surface cooperating with said angled sensor to determine both axial and radial displacement.

12. The work machine as claimed in claim 8, wherein said sensor is an eddy-current sensor.

13. The work machine as claimed in claim 8, further comprising an electronic control unit (ECU).

14. The work machine as claimed in claim 13, further comprising a sensor for sensing temperature of said housing and providing a signal therefrom to said ECU for compensating the displacement signal relative to temperature variations of said housing.

15. The power train component as claimed in claim 1, wherein a pair of bearing assemblies support said input shaft and said sensor is positioned between said pair of blearing assemblies.

16. The work machine as claimed in claim 8, wherein a pair of bearing assemblies support said input shaft and said sensor is positioned between said pair of blearing assemblies.

* * * * *